Oct. 10, 1944.　　A. B. LAMOREAUX　　2,359,997
KNURLING TOOL
Filed Feb. 27, 1941　　2 Sheets-Sheet 1

Witness:
Burr W. Jones

INVENTOR.
Andrew B. Lamoreaux
BY Clinton S. Janes
ATTORNEY.

Oct. 10, 1944.  A. B. LAMOREAUX  2,359,997
KNURLING TOOL
Filed Feb. 27, 1941  2 Sheets-Sheet 2

Witness:
Burr W. Jones

INVENTOR.
Andrew B. Lamoreaux
BY Clinton S. Janes
ATTORNEY.

Patented Oct. 10, 1944

2,359,997

UNITED STATES PATENT OFFICE 2,359,997

KNURLING TOOL

Andrew B. Lamoreaux, Elmira, N. Y., assignor to Bendix Aviation Corporation, South Bend, Ind., a corporation of Delaware Application February 27, 1941, Serial No. 380,857

2 Claims. (Cl. 80—5.1)

The present invention relates to a tool for knurling cylindrical surfaces.

Automatic lathes of the multi-spindle type are now very generally used for high speed production of interchangeable parts. The operations of turning, boring, threading, reaming, chamfering, et cetera, are readily carried out on such machines, but it has heretofore been difficult to satisfactorily perform knurling operations on machines of this type due to the high pressures necessarily involved in this type of work. This is particularly true when the work is in the form of a shaft or spindle, since the pressure necessary to force the knurl into the work is liable to spring both the work and the tool holder unless elaborate and expensive fixtures are employed with attendant difficulty of installation in limited space.

It is true that some knurling tools have been developed in which a support roll for the work is mounted in the tool opposite the knurling roll, and means such as a clamp bolt provided for squeezing the work between the knurling and support rolls. Such tools, however, are obviously not well adapted for use in a multi-spindle machine since they require separate means for actuating the clamping means after the tool has been applied to the work.

It is an object of the present invention to provide a novel tool for knurling cylindrical surfaces which is efficient and rapid in operation and simple in construction.

It is a further object to provide such a device which automatically furnishes a high mechanical advantage for the actuating mechanism.

It is another object to provide such a device in which the mechanical advantage increases as the knurling operation proceeds.

It is another object to provide such a device in which the depth of the knurling is automatically maintained constant irrespective of minor variations in travel of the actuating mechanism.

It is another object to provide such a device which incorporates a lateral support for the work immediately adjacent the surface to be knurled.

It is a further object to provide such a device in which the lateral support engages the work at a point directly opposite the knurling wheel when the maximum knurling pressure is being applied.

Further objects and advantages will be apparent from the following description taken in connection with the accompanying drawings in which.

Figure 1:
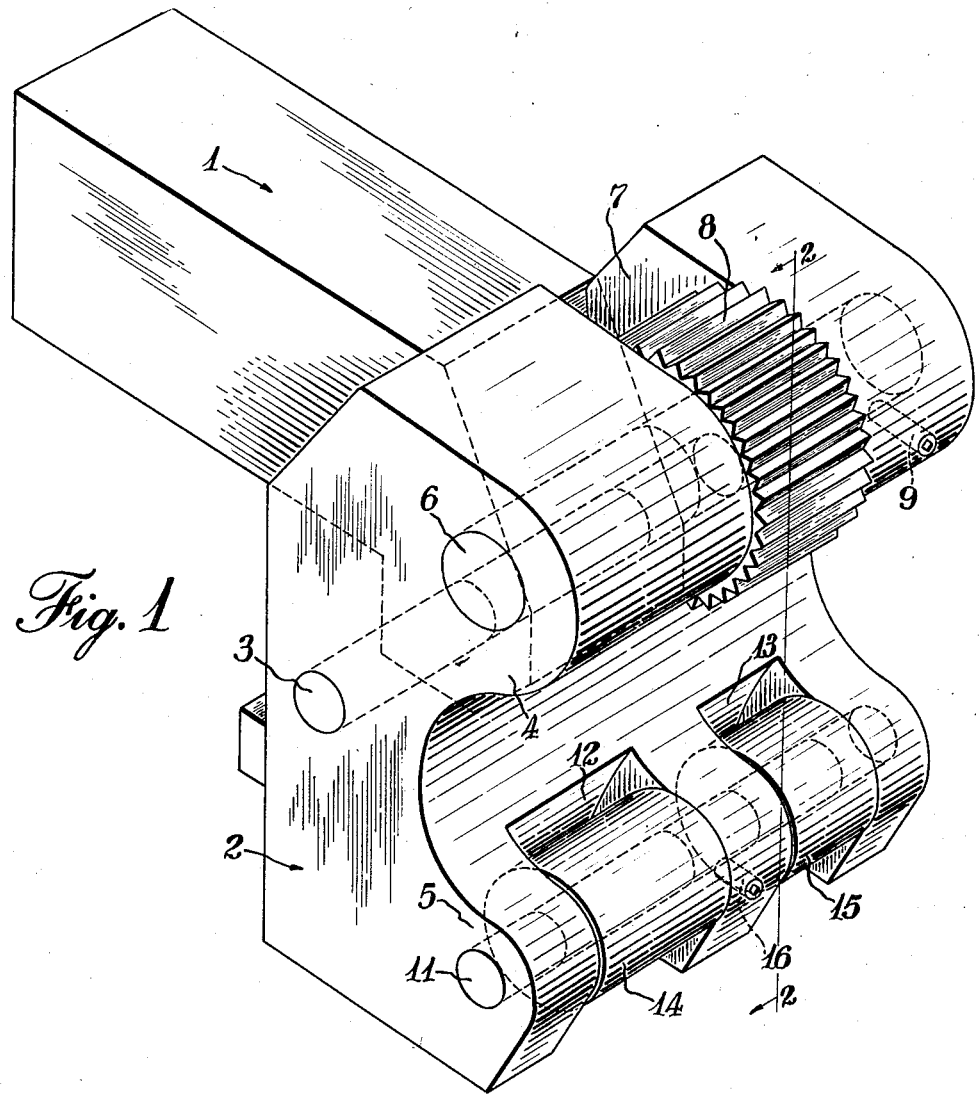
Fig. 1 is a perspective view of a knurling tool embodying a preferred form of the invention.

In Fig. 1 of the drawings there is illustrated a knurling tool comprising a straight shank 1 adapted to be mounted in any conventional form of tool holder capable of cross-feed in an automatic lathe or other suitable machine. A head 2 is pivoted on the shank 1 for slight angular movement by means of a wrist pin 3 traversing the shank and head.

The head 2 is provided with a pair of projecting jaws 4 and 5. Jaw 4 is bored out for the reception of a wrist pin 6 parallel to the wrist pin 3, and is provided with a recess 7 for the reception of a knurling roller 8 which is rotatably journalled on the wrist pin 6. Means such as a set screw 9 is preferably provided for immobilizing the wrist pin 6 in the jaw 4.

Jaw 5 is similarly bored out for the reception of a wrist pin 11, and is provided with recesses 12 and 13 for the reception of guide rollers 14 and 15 rotatably journalled on the wrist pin 11. That portion of the jaw 5 between the recesses 12 and 13 is located opposite the knurling roll 8 and is somewhat narrower than said knurling roll whereby the guide rollers 14 and 15 overlap the knurling roller to some extent. The wrist pin 11 is preferably fixed in the jaw 5 by means such as a set screw 16.

Figure 3:
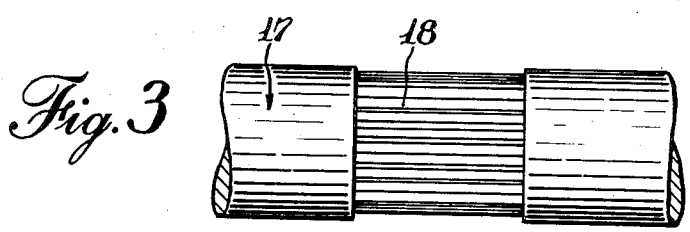
Fig. 3 is a side view of one form of work after the knurling operation has been completed.

In carrying out applicant's novel method of knurling with this tool, a work piece 17 such as shown in Fig. 3, may be employed. As there shown, the surface to be knurled is of somewhat reduced diameter, the shoulders defining such surface being preferably though not necessarily undercut. The knurling tool is so constructed in respect to the surface to be knurled that the distance between the knurling roll 8 and the guide rollers 14 and 15 is such that the work blank will almost but not quite enter said space, but when the knurling operation is completed as shown at 18, the work just completely fills said space.

Figure 2:
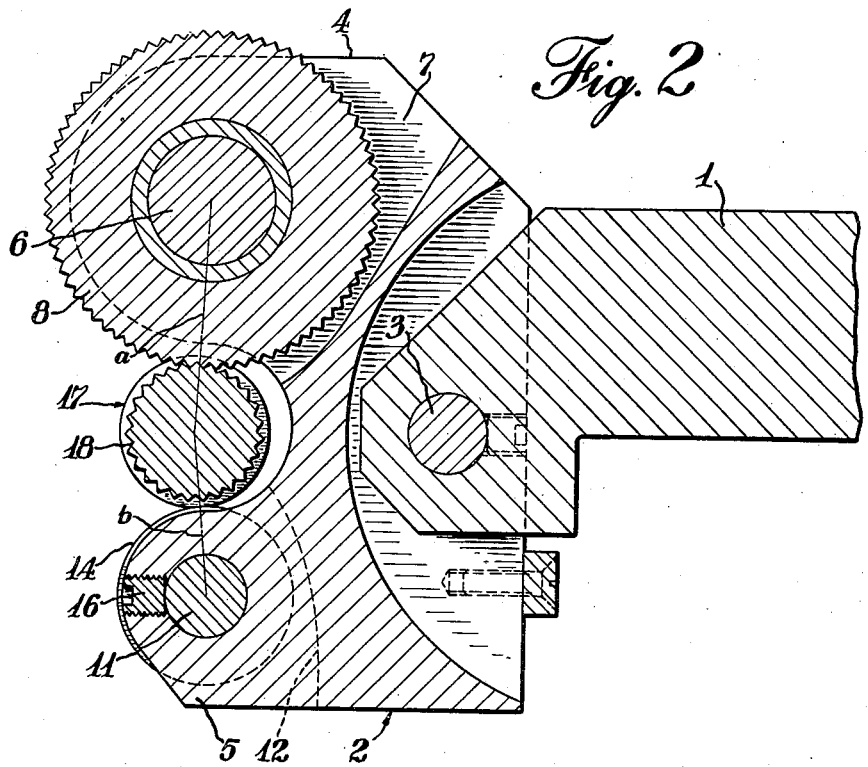
Fig. 2 is a section taken substantially on the line 2—2 of Fig. 1, showing the work just prior to the completion of the knurling operation.

In other words, lines a and b (Fig. 2) drawn perpendicular to the axes of the knurling roller 8 and guide rollers 14 and 15 respectively and intersecting the axis of the work, form the diagram of a toggle when the tool is applied to the work blank. As the tool is advanced against the blank, this toggle is straightened until when the knurling operation is completed, the axes of the rollers and work are substantially co-planar. It is obvious that by this arrangement adequate pressure for the knurling operation is readily provided with a comparatively small application of force on the knurling tool, and that the mechanical advantage provided by this arrangement increases as the knurling operation proceeds to completion. In this operation, any small vertical misalignment of the work with respect to the knurling tool is provided for by the pivotal mounting of the head on the shank so that any preferred form of cross-feed for the knurling tool capable of exerting the moderate amount of force necessary, may be satisfactorily employed.

It will be noted that inasmuch as the work occupies a position directly between the knurling and guide rollers when the operation is completed, it is impossible to carry the knurling operation further since a further advance of the tool begins to retract the knurling roller from the work. Strict uniformity in the knurling operation is thus assured irrespective of slight variations in adjustment of the cross-feed for the knurling tool.

Although but one embodiment of the invention has been shown and described in detail, it will be understood that other embodiments are possible and various changes might be made in the mode of carrying out the invention without departing from the spirit thereof as defined in the claims appended hereto.

What is claimed is:

1. A cylindrical knurling tool for an automatic lathe including a shank adapted to be mounted in a cross-feed device, a head mounted thereon, a knurling roller journalled in the head, and a pair of support rolls journalled in the head and spaced rigidly from the knurling roller a distance equal to the diameter of the work less the depth of the knurl, said head having a bearing for the support rolls directly opposite the knurling roller which bearing is narrower than the knurling roller so that the support rolls overlap the knurling roller.

2. A cylindrical knurling tool for an automatic lathe including a shank adapted to be mounted in a cross-feed device, a head mounted thereon, a knurling roller journalled in the head, and a pair of aligned support rolls journalled in the head parallel to the knurling roller spaced rigidly therefrom a distance equal to the diameter of the work less the depth of knurl, said head having a bearing for the support rolls directly opposite the knurling roller.

ANDREW B. LAMOREAUX.